United States Patent
Ha et al.

(10) Patent No.: US 6,717,632 B2
(45) Date of Patent: Apr. 6, 2004

(54) TRANSFLECTIVE LIQUID CRYSTAL DISPLAY DEVICE AND MANUFACTURING METHOD THEREOF

(75) Inventors: Kyoung-Su Ha, Seoul (KR); Woong-Kwon Kim, Gunpo-si (KR)

(73) Assignee: LG. Philips LCD Co., Ltd., Seoul (KR)

( * ) Notice: Subject to any disclaimer, the term of this patent is extended or adjusted under 35 U.S.C. 154(b) by 130 days.

(21) Appl. No.: 09/984,577

(22) Filed: Oct. 30, 2001

(65) Prior Publication Data

US 2002/0063824 A1 May 30, 2002

(30) Foreign Application Priority Data

Oct. 30, 2000 (KR) .................................. 10-2000-63915

(51) Int. Cl.[7] ............................................. G02F 1/1368
(52) U.S. Cl. .................... 349/43; 349/113; 349/114; 349/138; 349/139; 257/59; 257/72
(58) Field of Search ...................... 257/59, 72; 349/43, 349/113, 114, 138, 139

(56) References Cited

U.S. PATENT DOCUMENTS 5,892,563 A * 4/1999 Ono et al. ................. 349/143
6,466,280 B1 * 10/2002 Park et al. ................. 349/43
6,534,349 B1 * 3/2003 Kubota et al. ............. 438/158
2002/0022634 A1 * 2/2002 Chung et al. ............... 349/43

FOREIGN PATENT DOCUMENTS

| EP | 534 467 | * | 9/1992 |
| JP | 11-218751 | * | 8/1999 |
| JP | 11-288007 | * | 10/1999 |
| JP | 11-326941 | * | 11/1999 |
| JP | 2000-258802 | * | 9/2000 |

* cited by examiner

Primary Examiner—Nathan J. Flynn
Assistant Examiner—Ahmed N. Sefer
(74) Attorney, Agent, or Firm—McKenna Long & Aldridge (57) ABSTRACT

A transflective liquid crystal display (LCD) device is used both in transmissive and reflective modes. An array substrate for a transflective liquid crystal display device includes a substrate, a plurality of thin film transistors, a first passivation layer having a plurality of first contact holes, a plurality of transparent electrodes, a second passivation layer having a plurality of second contact holes and a plurality of reflective electrodes having a plurality of first transmissive holes, wherein the first and second passivation layers have different thicknesses and an area of the contact holes in the thicker passivation layer is narrower than that of the contact holes in the other passivation layer.

24 Claims, 5 Drawing Sheets

TRANSFLECTIVE LIQUID CRYSTAL DISPLAY DEVICE AND MANUFACTURING METHOD THEREOF

This application claims the benefit of Korean Patent Application No. 2000-0063915, filed on Oct. 30, 2000 in Korea, which is hereby incorporated by reference.

BACKGROUND OF THE INVENTION

1. Field of the Invention

The present invention relates to a liquid crystal display device, and more particularly, to a transflective liquid crystal display (LCD) device having a color filter substrate and manufacturing method thereof.

2. Discussion of the Related Art

Generally, typical thin film transistor liquid crystal display (TFT-LCD) devices include an upper substrate and a lower substrate with liquid crystal molecules interposed therebetween. The upper substrate and the lower substrate are generally referred to as a color filter substrate and an array substrate, respectively. The upper substrate and the lower substrate respectively include electrodes disposed on opposing surfaces of the upper substrate and the lower substrate. An electric field is generated by applying a voltage to the electrodes, thereby driving the liquid crystal molecules to display images depending on light transmittance.

In accordance with the application of an internal or external light source, LCD devices are commonly classified into two categories: a transmission type and a reflection type. The transmission type LCD has a liquid crystal display panel that does not emit light, and therefore, a backlight is provided to function as a light-illuminating source. The backlight is disposed at a first or rear side of the panel, and light emitted from the backlight passes through the liquid crystal panel to be controlled by the liquid crystal panel, thereby displaying an image. That is, the liquid crystal panel display forms an image according to an arrangement of the liquid crystal molecules that transmit or interrupt light emitted from the backlight. However, the backlight of the transmission type LCD consumes 50% or more of the total power consumed by the LCD device. Accordingly, the use of the backlight increases power consumption of the LCD device.

To reduce power consumption, reflection type LCD devices have been developed for portable information apparatuses that are often used outdoors or carried along with users. Such reflection type LCD devices are provided with a reflector formed on one of a pair of substrates, and ambient light is reflected from the surface of the reflector. However, visibility of the display of reflection type LCD devices is extremely poor when the surrounding environment is dark and no ambient light is available.

In order to overcome the above problems, a transflective liquid crystal display device has been proposed that utilizes both transmissive and reflective mode displays in a single liquid crystal display device. The transflective liquid crystal display (LCD) device alternatively acts as a transmissive LCD device and a reflective LCD device by making use of both internal and external light sources, thereby providing operation with low power consumption in good ambient light conditions.

Figure 1:
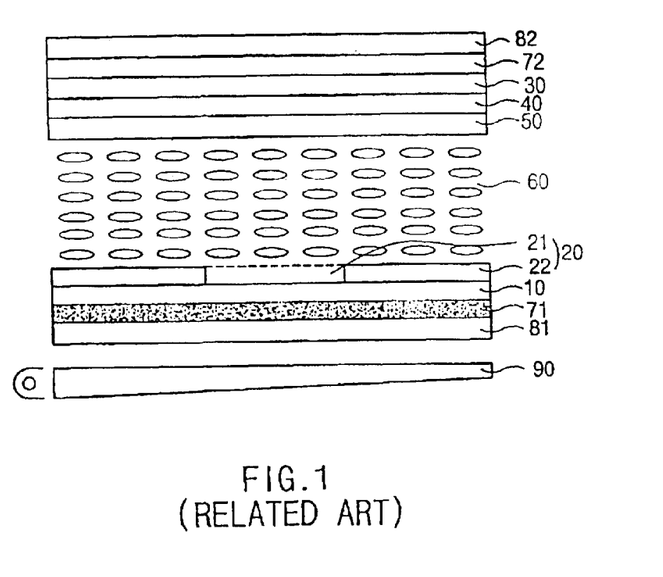
FIG. 1 is a schematic cross-sectional view of a typical transflective LCD device.

FIG. 1 is a schematic cross-sectional view showing a layer structure of a typical transflective LCD device.

As shown, the transflective LCD device includes upper and lower substrates 30 and 10 and a horizontally oriented liquid crystal layer 60 interposed therebetween. The lower substrate 10 has a thin film transistor (TFT) (not shown) and a pixel electrode 20 disposed on the surface facing the upper substrate 30. The pixel electrode 20 includes reflective electrode portions 22 and a transparent electrode portion 21 disposed in an opening therebetween. The transparent electrode 21 is formed of ITO (indium-tin-oxide) or IZO (indium-zinc-oxide) having high light transmittance, and the reflective electrode 21 is made of aluminum (Al) having low electrical resistance and superior light reflectance.

The upper substrate 30 includes a color filter 40 formed on the surface facing the lower substrate 10 corresponding to the pixel electrode 20, and a common electrode 50 formed on the color filter 40.

Furthermore, first and second retardation films 71 and 72 are formed on outer surfaces of the lower and upper substrates 10 and 30, respectively. The first and second retardation films 71 and 72 are quarter wave plates (QWPs). The first and second QWPs 71 and 72 change a polarization state of light transmitted through the liquid crystal layer 60, specifically, convert linearly polarized light into right- or left-handed circularly polarized light, and conversely convert right- or left-handed circularly polarized light into linearly polarized light. Lower and upper polarizers 81 and 82 are formed on each outer surface of the first and the second QWPs 71 and 72, respectively. Here, a polarization axis of the upper polarizer 82 makes an angle of 90 degrees with a polarization axis of the lower polarizer 81. Furthermore, a backlight device 90 is disposed adjacent to the lower polarizer 81 and functions as a light source in the transmissive mode.

However, since the transflective LCD device is designed on the basis of the reflective mode, the transmittance of the transmissive mode is only about 50% of that of the reflective mode without the applying voltage the liquid crystal layer. Therefore, the transmittances of the reflective and transmissive modes can be the same by making the liquid crystal layer of the transmissive area thicker than that of the reflective area.

Figure 2:
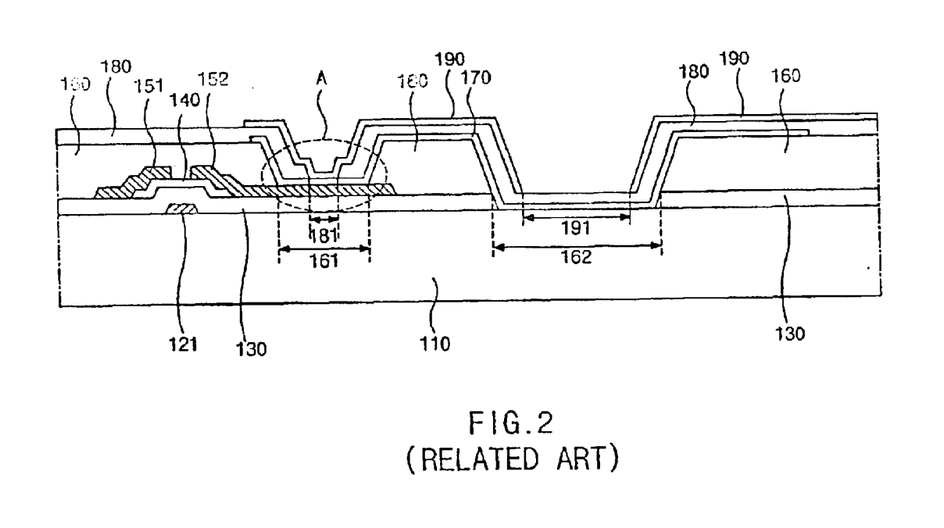
FIG. 2 is a schematic cross-sectional view of an array substrate for a conventional transflective LCD device.

FIG. 2 is a schematic cross-sectional view showing the array substrate of the transflective LCD device as described above.

The region of the array substrate is divided into transmissive and reflective areas. As shown, the gate electrode 121 is patterned on the insulating substrate 110 and the gate insulator 130 is formed thereon. The active layer 140 of amorphous silicon is patterned on the gate insulator 130 and the source and drain electrodes 151 and 152 are patterned thereon. The ohmic contact layer (not shown) is interposed between the active layer 140 and the source and drain electrodes 151 and 152. The source and drain electrodes 151 and 152 are covered with the first passivation layer 160 of the organic insulator, which includes the first contact hole 161 that exposes the drain electrode 152 and the first transmissive hole 162 at the position corresponding to the transmissive area. Since the liquid crystal layer of the transmissive area is thicker than that of the reflective area due to the first transmissive hole 162, the brightness of the transmissive and reflective modes can be made uniform. It is desirable to make the thickness of the transmissive area twice as that of the reflective area. The transmissive electrode 170 of the transparent conducting material is patterned on the first passivation layer 160 and connected with the drain electrode 152 through the first contact hole 161. The second passivation layer 180 of a material such as silicon nitride (SiNx) is formed on the transmissive electrode 170 and includes a second contact hole 181 that exposes the transmissive electrode 170 on the first contact hole 161. The reflective electrode 190 is patterned on the second passivation layer 180 and connected with the transmissive electrode 170 through the second contact hole 181. Furthermore, the reflective electrode 190 includes the second transmissive hole 191 that exposes the transmissive electrode 170 on the first transmissive hole 162 and can be made of the aluminous metal of low resistance and high reflectance.

Consequently, in the transflective LCD devices, the transmittance of the transmissive mode can be made nearly the same as that of the reflective mode by forming the hole at the transmissive area of the organic insulator and making the thickness of the liquid crystal layer at the transmissive area twice that at the reflective area.

However, since the thickness of the liquid crystal layer increases by the depth of the first and second contact holes 161 and 181, the light efficiency of the area on the contact holes is reduced. Therefore, the transmittance of the reflective mode decreases.

Figure 3:
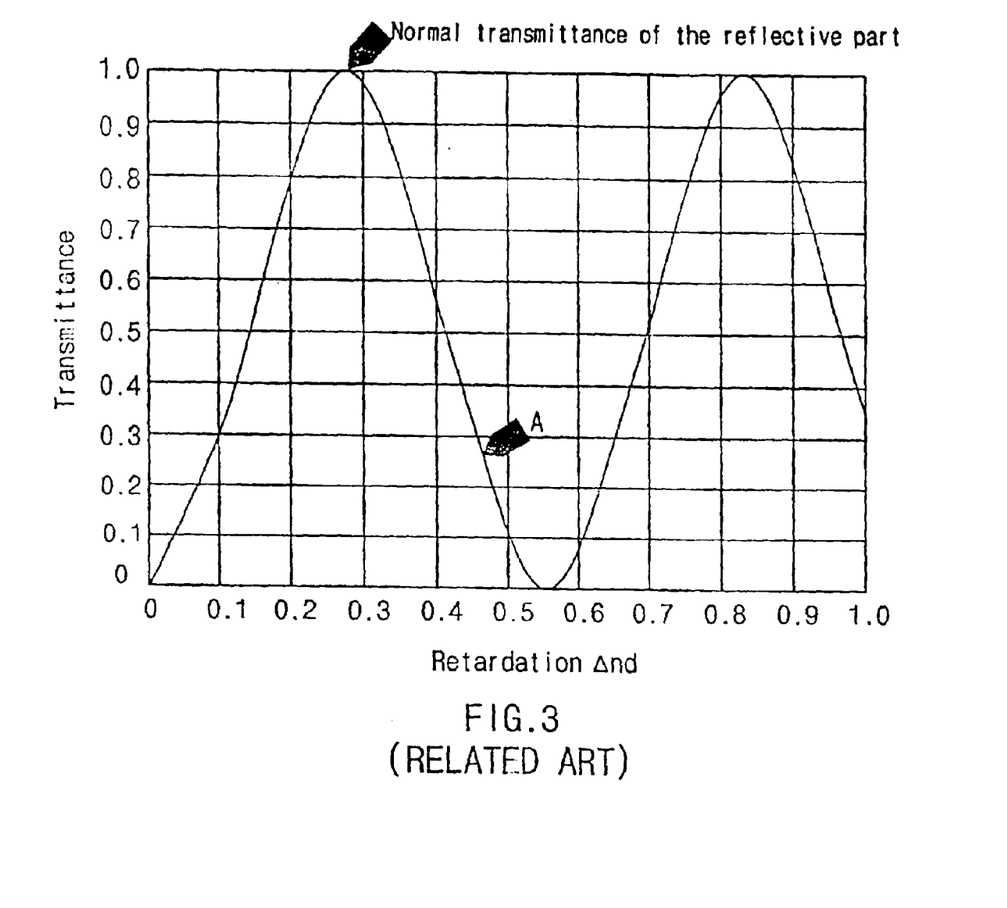
FIG. 3 is a graph showing a transmittance of a reflective mode in a conventional transflective LCD device.

FIG. 3 shows the transmittance of the reflective mode of the transflective LCD device according to the retardation $\Delta n.d$. Here, the transmittance means the rate of the reflective light to the incident light.

As shown, since the liquid crystal layer of the area of the contact holes 161, 181 in region "A" is thicker than that of any other regions, the retardation $\Delta n.d$ is different and the transmittance of this region is much lower than that of the normal reflective mode. The larger the area of the contact holes 161, 181, the lower the brightness of the reflective mode. Furthermore, considering the fabrication margin, the area of the first contact hole 161 is three or four times that of the second contact hole 181. Therefore, the total brightness of the reflective mode decreases by the decrease of the transmittance due to the depth of the contact holes 161, 181 and the increase of the area of the contact holes 161, 181.

BRIEF SUMMARY OF THE INVENTION

Accordingly, the present invention is directed to a transflective liquid crystal display device and manufacturing method thereof that substantially obviates one or more of problems due to limitations and disadvantages of the related art.

An object of the present invention is to provide a transflective liquid crystal display device and a manufacturing method thereof that has a uniform transmittance both in the reflective and transmissive modes.

Another object of the present invention is to provide a transflective liquid crystal display device and a manufacturing method thereof that has a high brightness in the reflective mode.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a transflective liquid crystal display device includes a substrate, a plurality of thin film transistors formed on the substrate and having gate, source and drain electrodes, a first passivation layer covering the thin film transistors and having a plurality of first contact holes exposing the drain electrodes, a plurality of transparent electrodes formed on the first passivation layer and connected with the drain electrodes through the first contact holes, a second passivation layer formed on the transparent electrodes and having a plurality of second contact holes exposing the transparent electrodes on the first contact holes and a plurality of reflective electrodes formed on the second passivation layer, connected with the transparent electrodes through the second contact holes and having a plurality of first transmissive holes, wherein the first and second passivation layers have different thicknesses and an area of the contact holes in the thicker passivation layer is broader than that of the contact holes in the other passivation layer.

In another aspect of the present invention, an array substrate for a transflective liquid crystal display device includes a substrate, a plurality of thin film transistors formed on the substrate and having gate, source and drain electrodes, a first passivation layer covering the thin film transistors and having a plurality of first contact holes exposing the drain electrodes, a plurality of transparent electrodes formed on the first passivation layer and connected with the drain electrodes through the first contact holes, a second passivation layer formed on the transparent electrodes and having a plurality of second contact holes exposing the transparent electrodes on the other portion of the first contact holes and a plurality of reflective electrodes formed on the second passivation layer, connected with the transparent electrodes through the second contact holes and having a plurality of first transmissive holes, wherein the first and second passivation layers have different thicknesses.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 4:
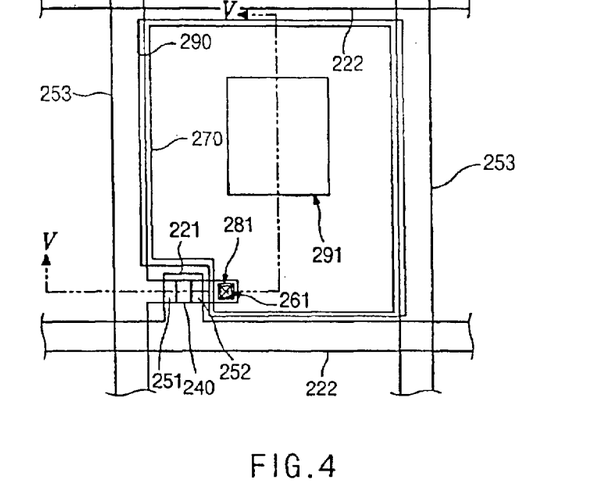
FIG. 4 is a schematic cross-sectional view of a first exemplary array substrate for a transflective LCD device according to the present invention.
Figure 5:
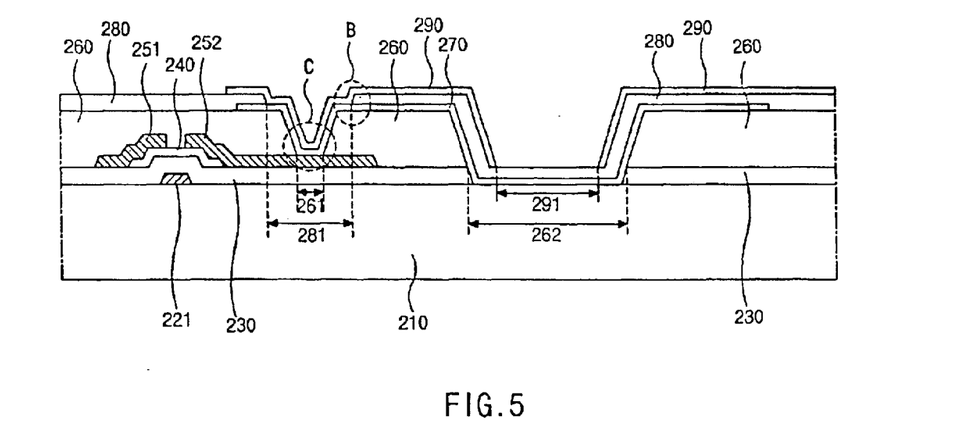
FIG. 5 is a schematic cross-sectional view taken along line V—V of FIG. 4.

FIG. 4 is a schematic cross-sectional view of a first exemplary array substrate for a transflective LCD device according to the present invention and FIG. 5 is a schematic cross-sectional view taken along line V—V of FIG. 4.

As shown, gate lines 222 and gate electrodes 221 of metallic materials are patterned on an insulating substrate and a gate insulator 230, for example, silicon nitride film (SiNx) or silicon dioxide film ($SiO_2$), is formed thereon. An active layer 240 of amorphous silicon is patterned on the gate insulator 230 and data lines 253 and source and drain electrodes 251 and 252 are patterned thereon. A first passivation layer 260 of an organic insulator covers the source and drain electrodes 251 and 252, and has a first contact hole 261 exposing the drain electrode 252 and a first transmissive hole 262 at the position corresponding to the transmissive area. Here, the passivation layer can be made of benzocyclobutene (BCB) or acrylic photosensitive resin. A transparent electrode 270 of transparent conductive materials such as ITO or IZO is patterned on the first passivation layer 260 and connected with the drain electrode 252 through the first contact hole 261. A second passivation layer 280 of a material such as silicon nitride (SiNx) is formed on the transparent layer 270 and has a second contact hole 281 exposing the transparent electrode 270 through the first contact hole 261. A reflective electrode 290 is patterned on the second passivation layer 280 and connected with the transparent electrode 270 through the second contact hole 281. The reflective electrode 290 has a second transmissive hole 291 exposing the transparent electrode 270 through the first transmissive hole 262 and can be made of aluminous materials of low resistance and high reflectance.

Figure 6:
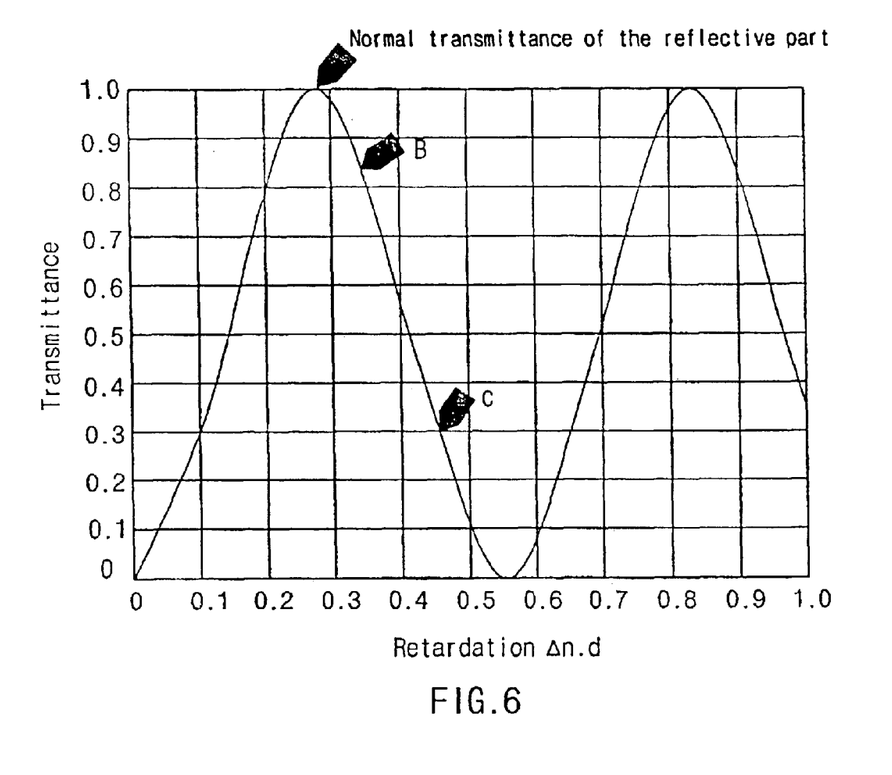
FIG. 6 is a graph showing a transmittance of a reflective mode in a transflective LCD device according to the present invention.

FIG. 6 is a graph showing a transmittance of a reflective mode in a transflective LCD device according to the present invention As shown, though the region "C" of the first contact hole 261 has low transmittance, the area of the region is small compared with the related art. Since the region "B" of the second contact hole 281 which does not overlap with the first contact hole 261, has nearly the same transmittance as the normal reflective mode, the reduction of the transmittance of the reflective mode is small.

Therefore, in the transflective LCD device according to the present invention, the brightness increases due to the reduction of the area in which the transmittance of the reflective mode is low.

Figure 7:
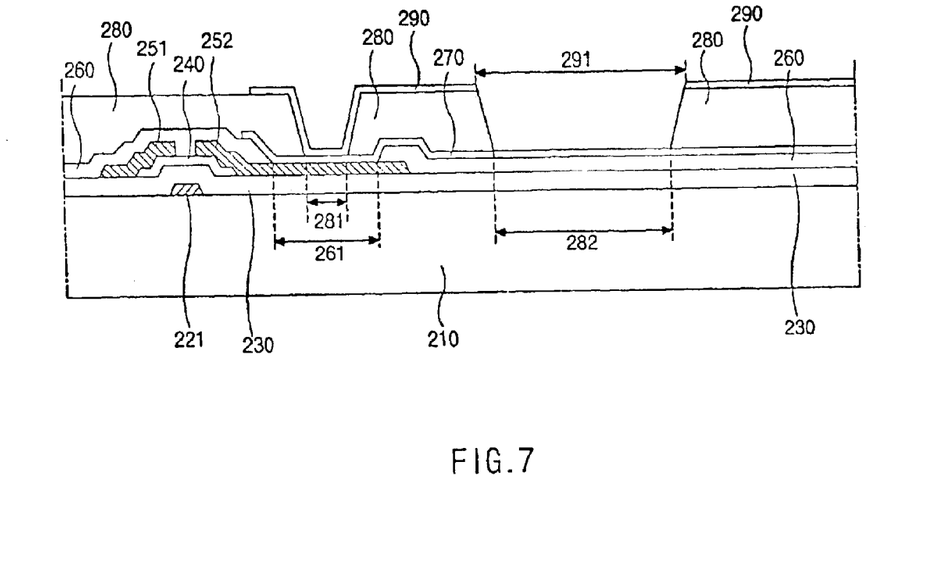
FIG. 7 is a schematic cross-sectional view of a second exemplary array substrate for a transflective LCD device according to the present invention.

FIG. 7 is a schematic cross-sectional view of a second exemplary array substrate for a transflective LCD device according to the present invention.

As shown, another exemplary array substrate has nearly the same structure as the first exemplary structure except for the first and second passivation layers 260 and 280, the first and second contact holes 261 and 281 and the first transmissive hole 282. A gate electrode 221 is patterned on a substrate 210 a gate insulator 230 is formed thereon. An active layer 240 is patterned on the gate insulator 230 and source and drain electrodes 251 and 252 are patterned thereon. A first passivation layer 260 of materials like silicon nitride (SiNx) film covers the source and drain electrodes 251 and 252, and has a first contact hole 261 exposing the drain electrode 252. A transparent electrode 270 of transparent conductive materials is patterned on the first passivation layer 260 and connected with the drain electrode 252 through the first contact hole 261. A second passivation layer 280 of organic materials covers the transparent layer 270. The second passivation layer 280 has a second contact hole 281, whose area is smaller than that of the first contact hole 261, on the first contact hole 261 and a first transmissive hole 282 at the transmissive area. A reflective electrode 290 is patterned on the second passivation layer 280 and connected with the transparent electrode 270 through the second contact hole 281. The reflective electrode 290 has a second transmissive hole 291 on the first transmissive hole 282. Here, since the second passivation layer 280 is thicker than the first passivation layer 260, the reflective area, which has the different thickness of the liquid crystal, can be minimized by forming the second contact hole 281 of the second passivation layer 280 smaller than the first contact hole 261 of the first passivation layer 260.

Therefore, in the present invention, the reduction of the transmittance can be minimized by making the contact hole area of the thicker passivation layer smaller.

Figure 8:
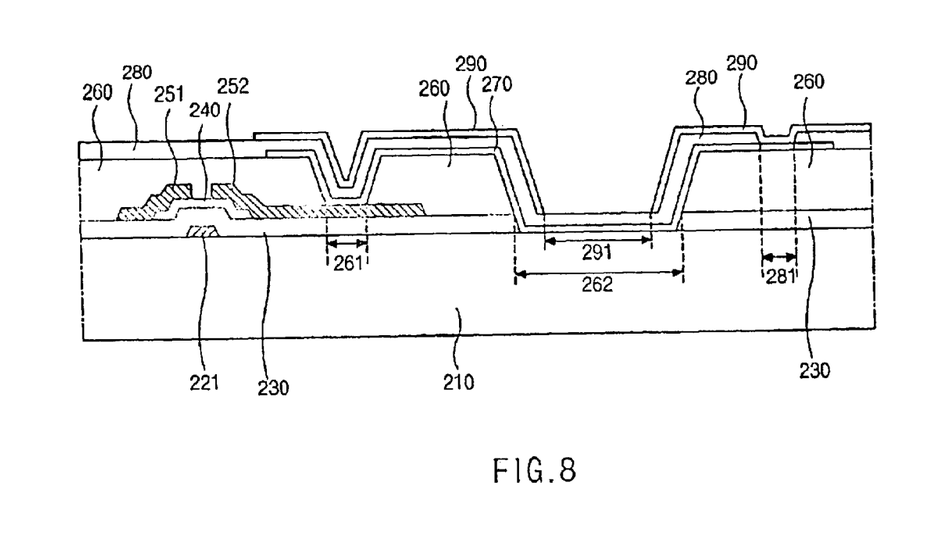
FIG. 8 is a schematic cross-sectional view of a third exemplary array substrate for a transflective LCD device according to the present invention.

FIG. 8 is a schematic cross-sectional view of a third exemplary array substrate for a transflective LCD device according to the present invention.

As shown, another exemplary array substrate has nearly the same structure as the first exemplary structure except for the position of the contact hole, i.e., the position of a second contact hole 281 is different from that of a first contact hole 261. The first contact hole 261 is patterned on a drain electrode 252 and the second contact hole 281 is patterned on the reflective area, but not in the region of the first contact hole 261. Here, since the first and second contact holes 261 and 281 are patterned at the different positions, both areas of the contact holes can be minimized, respectively.

Therefore, the decrease of the transmittance can be reduced by minimizing the area of low transmittance in the reflective mode.

Consequently, the transflective LCD devices of the present invention have some advantages. The transmittances of the reflective and transmissive modes can be uniform by the passivation layer having the transmissive holes and the decrease of the transmittance in the reflective mode can be reduced by making the contact hole area of the thicker passivation layer smaller than the contact hole of the other passivation layer or by forming the contact holes at the different positions. Therefore, the brightness of the transflective LCD devices in the reflective mode can increase.

It will be apparent to those skilled in the art that various modifications and variations can be made in the transflective LCD device and the manufacturing method thereof of the present invention without departing from the spirit or scope of the invention. Thus, it is intended that the present invention cover the modifications and variations of this invention provided they come within the scope of the appended claims and their equivalents.

What is claimed is:

1. An array substrate for a transflective liquid crystal display device, comprising:
    a substrate;
    a thin film transistor formed on the substrate and having gate, source and drain electrodes;
    a first passivation layer covering the thin film transistor and having a first contact hole exposing the drain electrode;
    a transparent electrode formed on the first passivation layer and connected with the drain electrode through the first contact hole;
    a second passivation layer formed on the transparent electrode and having a second contact hole exposing the transparent electrode over the first contact hole; and a reflective electrode formed on the second passivation layer, connected with the transparent electrode through the second contact hole and having a first transmissive hole, wherein the first and second passivation layers have different thicknesses and an area exposed by the contact hole in the thicker passivation layer is less than an area exposed by the contact hole in the other passivation layer.

2. The array substrate for the transflective liquid crystal display device according to claim 1, further comprising a second transmissive hole in the thicker passivation layer under the first transmissive hole.

3. The array substrate for the transflective liquid crystal display device according to claim 1, wherein the thicker passivation layer is made of an organic insulator.

4. The array substrate for the transflective liquid crystal display device according to claim 3, wherein the thicker passivation layer is made of one of a benzocyclobutene and an acrylic photosensitive resin.

5. The array substrate for the transflective liquid crystal display device according to claim 3, wherein the thinner passivation layer is made of a silicon nitride.

6. An array substrate for a transflective liquid crystal display device, comprising:

a substrate;

a thin film transistor formed on the substrate and having gate, source and drain electrodes;

a first passivation layer covering the thin film transistor and having a first contact hole exposing the drain electrode;

a transparent electrode formed on the first passivation layer and connected with the drain electrode through a portion of the first contact hole;

a second passivation layer formed on the transparent electrode and having a second contact hole exposing the transparent electrode, wherein the position of the second contact hole does not correspond to the first contact hole; and a reflective electrode formed on the second passivation layer, connected with the transparent electrode through the second contact hole and having a first transmissive hole, wherein the first and second passivation layers have different thicknesses; and wherein one of the first and second passivation layers is a thicker passivation layer and the other is a thinner passivation layer and the thicker passivation layer has a smaller contact hole area than the thinner passivation layer.

7. The array substrate for the transflective liquid crystal display device according to claim 6, wherein the thicker passivation layer further includes a second transmissive hole under the first transmissive hole.

8. The array substrate for the transflective liquid crystal display device according to claim 6, wherein the thicker passivation layer is made of an organic insulator.

9. The array substrate for the transflective liquid crystal display device according to claim 8, wherein the thicker passivation layer is made of one of a benzocyclobutene and an acrylic photosensitive resin.

10. The array substrate for the transflective liquid crystal display device according to claim 8, wherein the thinner passivation layer is made of a silicon nitride.

11. An array substrate for a transflective liquid crystal display device, comprising:

a substrate;

a thin film transistor formed on the substrate and having gate, source and drain electrodes;

a first passivation layer having a first thickness covering the thin film transistor and having a first contact hole exposing the drain electrode;

a transparent electrode formed on the first passivation layer and connected with the drain electrode through the first contact hole;

a second passivation layer having a second thickness formed on the transparent electrode and having a second contact hole exposing the transparent electrode; and a reflective electrode formed on the second passivation layer, connected with the transparent electrode through the second contact hole and having a first transmissive hole, wherein the first and second thicknesses are different; and wherein one of the first and second passivation layers is a thicker passivation layer and the other is a thinner passivation layer and the thicker passivation layer has a smaller contact hole area than the thinner passivation layer.

12. The array substrate according to claim 11, wherein the second contact hole is over a portion of the first contact hole.

13. The array substrate according to claim 11, wherein the second contact hole is not over a portion of the first contact hole.

14. The array substrate according to claim 11, wherein the first thickness is greater than the second thickness, and the first passivation layer includes a second transmissive hole under the first transmissive hole.

15. The array substrate of claim 14, wherein the first passivation layer is made of an organic insulator.

16. The array substrate of claim 15, wherein the first passivation layer is made of one of a benzocyclobutene and an acrylic photosensitive resin.

17. The array substrate of claim 14, wherein the second passivation layer is made of silicon nitride.

18. The array substrate of claim 17, wherein the second passivation layer is made of a silicon nitride film.

19. The array substrate according to claim 11, wherein the second thickness is greater than the first thickness, and the second passivation layer includes a second transmissive hole under the first transmissive hole.

20. The array substrate of claim 19, wherein the second passivation layer is made of an organic insulator.

21. The array substrate of claim 19, wherein the second passivation layer is made of one of a benzocyclobutene and an acrylic photosensitive resin.

22. The array substrate of claim 19, wherein the first passivation layer is made of silicon nitride.

23. The array substrate of claim 22, wherein the first passivation layer is made of a silicon nitride film.

24. An array substrate for a transflective liquid crystal display device, comprising:

a substrate;

a thin film transistor formed on the substrate and having gate, source and drain electrodes;

a first passivation layer covering the thin film transistor and having a first contact hole exposing the drain electrode;

a transparent electrode formed on the first passivation layer and connected with the drain electrode through the first contact hole;

a second passivation layer formed on the transparent electrode and having a second contact hole exposing the transparent electrode in a region not overlapping the first contact hole; and a reflective electrode formed on the second passivation layer, connected with the transparent electrode through the second contact hole and having a first transmissive hole, wherein the first and second passivation layers have different thicknesses and an area exposed by the contact hole in the thicker passivation layer is less than an area exposed by the contact hole in the other passivation layer.

* * * * *